US008041641B1

(12) United States Patent
Panchbudhe et al.

(10) Patent No.: US 8,041,641 B1
(45) Date of Patent: Oct. 18, 2011

(54) BACKUP SERVICE AND APPLIANCE WITH SINGLE-INSTANCE STORAGE OF ENCRYPTED DATA

(75) Inventors: Ankur P. Panchbudhe, Pune (IN); Srineet Sridharan, Pune (IN)

(73) Assignee: Symantec Operating Corporation, Mountain View, CA (US)

( * ) Notice: Subject to any disclaimer, the term of this patent is extended or adjusted under 35 U.S.C. 154(b) by 641 days.

(21) Appl. No.: 11/641,931

(22) Filed: Dec. 19, 2006

(51) Int. Cl.
*G06F 17/30* (2006.01)
*G06F 12/14* (2006.01)

(52) U.S. Cl. .................. 705/52; 707/613; 711/202

(58) Field of Classification Search .................. 707/204; 726/23
See application file for complete search history.

(56) References Cited

U.S. PATENT DOCUMENTS

| 5,479,654 | A | * | 12/1995 | Squibb | 707/201 |
|---|---|---|---|---|---|
| 5,765,173 | A | * | 6/1998 | Cane et al. | 707/204 |
| 5,794,254 | A | * | 8/1998 | McClain | 707/204 |
| 5,990,810 | A | * | 11/1999 | Williams | 341/51 |
| 6,014,676 | A | * | 1/2000 | McClain | 707/204 |
| 6,038,665 | A | * | 3/2000 | Bolt et al. | 713/176 |
| 6,049,874 | A | * | 4/2000 | McClain et al. | 713/176 |
| 6,101,507 | A | * | 8/2000 | Cane et al. | 707/204 |
| 2004/0236803 | A1 | * | 11/2004 | Spiegeleer | 707/204 |
| 2005/0268068 | A1 | * | 12/2005 | Ignatius et al. | 711/202 |
| 2007/0100913 | A1 | * | 5/2007 | Sumner et al. | 707/204 |
| 2007/0192863 | A1 | * | 8/2007 | Kapoor et al. | 726/23 |

OTHER PUBLICATIONS

Athicha Muthitacharoen, Benjie Chen, and David Mazières, "A Low-bandwidth Network File System," Proc. 18th ACM Symposium on Operating Systems Principles (SOSP '01), Banff, Canada (downloaded Nov. 2, 2006 from http://pdos.csail.mit.edu/papers/lbfs-:sosp01), Oct. 2001.

John R. Douceur, Atul Adya, William J. Bolosky, Dan Simon, and Marvin Theimer, "Reclaiming Space from Duplicate Files in a Serverless Distributed File System" ("Technical Report MSR-TR-2002-30"), Microsoft Research, Microsoft Corporation, One Microsoft Way, Redmond, WA 98052 (downloaded Nov. 2, 2006 from http://citeseer.ist.psu.edu/douceur02reclaiming.html), Jul. 2002.

Christopher Batten, Kenneth Barr, Arvind Saraf, and Stanley Trepetin, "pStore: A Secure Peer-to-Peer Backup System," ("LCS Technical Memo 632"), MIT Laboratory for Computer Science (downloaded Nov. 2, 2006 from http://www.mit.edu/~cbatten/) Oct. 2002.

(Continued)

*Primary Examiner* — Evens J Augustin
(74) *Attorney, Agent, or Firm* — Campbell Stephenson LLP

(57) ABSTRACT

One implementation of a method for providing backup storage services for encrypted data includes receiving signatures of convergently encrypted portions of data from client computers, determining whether the encrypted portions are already present on a backup storage, and obtaining only the needed portions. Users unassociated with a particular user account are denied access to information backed up in that account. The backup storage also stores password protected key files holding signatures of the unencrypted portions of data. One implementation of a system includes a memory, a single-instance storage circuit, a user account management circuit, and a signature index. The memory holds a user-account database and backup copies of convergently encrypted portions of data. The single-instance storage circuit uses the signature index to prevent duplicative backup copies. The user account management circuit responds to download requests after authenticating the user information associated with the requested data.

28 Claims, 7 Drawing Sheets

OTHER PUBLICATIONS

Landon P. Cox, Christopher Murray, and Brian Noble, "Pastiche: Making Backup Cheap and Easy," Proc. 5th USENIX Symposium on Operating Systems Design and Implementation, Boston, MA (downloaded Nov. 2, 2006 from http://citeseer.ist.psu.edu/cox02pastiche.html), Dec. 2002.

M. Landers, H. Zhang, and K.L. Tan, "PeerStore: Better Performance by Relaxing in Peer-to-Peer Backup," Proc. 4th IEEE International Conference on Peer-to-Peer Computing, Zurich, Switzerland, pp. 72-79, (downloaded Nov. 2, 2006 from http://www.comp.nus.edu.sg/~tankl/peerstore.pdf), Aug. 2004.

Joe Cooley, Chris Taylor, Alen Peacock, "ABS: The Apportioned Backup System" ("MIT 6.824 Final Project"), MIT (downloaded Nov. 2, 2006 from http://pdos.csail.mit.edu/6.824-2004/reports/), 2004.

"LBFS: A Low-bandwidth Network File System," web page (downloaded Nov. 2, 2006 from http://www.fs.net/lbfs).

* cited by examiner

BACKUP SERVICE AND APPLIANCE WITH SINGLE-INSTANCE STORAGE OF ENCRYPTED DATA

BACKGROUND OF THE INVENTION

1. Field of the Invention

The present invention relates to backup storage services in general, and more particularly relates to techniques for backup storage with reduced data redundancy.

2. Description of the Related Art

Backup servers enable users of data systems to store copies of data for safekeeping. Users may have working data on a system such as a primary data server. The users may wish to make a backup copy of the data, so that the backup copy is available in case of equipment failure or in case of user errors that can corrupt or destroy the data stored on the primary data server. In some situations, users may wish to have the backup data stored in a remote location, so that a local catastrophe such as a fire or weather-related incident that affects the primary data server is not likely to affect the remote location.

Operators of backup servers may wish to ensure that their storage systems are used in an efficient-manner. One technique for increasing the efficiency of a storage system is to avoid storing duplicate copies of data. This technique is generally thwarted, however, when users encrypt data prior to submission for backup storage. In such situations, a backup storage server may not be able to determine whether or not two portions (or "chunks") of data carry the same contents, since the contents are obscured by the encryption. The interest of users in protecting their data by encryption can thus clash with the interest of operators in making efficient use of their storage systems. It would be helpful to have techniques that furthered both of these interests.

SUMMARY OF THE INVENTION

Various embodiments of methods and systems for performing data backup operations are disclosed. In one implementation, a method includes receiving signatures (such as hashes) of encrypted portions of data for storage in user accounts on a backup service. The signatures are received from subscribing users via client computers connected to a wide area network such as the internet. The encrypted portions of data include an encrypted first portion of a first payload data for a first storage account, an encrypted second portion of the first payload data, an encrypted first portion of a second payload data for a second storage account, and an encrypted second portion of the second payload data. The method further includes determining whether the encrypted portions of payload data are already present in a backup storage. In various versions of the method, this determining is performed by, checking whether the received signatures are already present in an index holding signatures of all the encrypted portions of data on the backup storage. If the checking indicates that one or more of the received signatures is absent from the index, then the corresponding encrypted portions of data are obtained from the appropriate clients and are added to the backup storage. If the checking indicates that one or more of the received signatures is already present in the index, then the corresponding encrypted portions of data need not be obtained, and need not be stored again in the backup storage.

Various versions of the method also prevent unauthorized access to the encrypted portions of data. Thus, users not associated with a particular user account can be denied access to the encrypted portions of data stored for that user account.

The encrypted portions of data are generated by applying convergent encryption to portions of the payload data. The portions of the payload data may be generated by "chunking" procedures, such as content-dependent chunking, fixed size chunking, or variable size chunking of the payload data. Various content-dependent chunking protocols can be used to increase the probability that repeated instances of the same data are extracted into identical portions of data. The chunking protocols can also be optimized based on the type of data being addressed, such as binary executables, text files, or binary data files for various standard applications.

The convergent encryption generates signatures of the portions of the payload data, for example by using a strong hash function. The signature of each portion is used to encrypt that portion to generate the encrypted portions of data. In various version of the method, the encrypted portions of data are generated by client computers, and the client computers avoid transmitting the unencrypted original payload data.

In another implementation, a method includes establishing a user account on a backup storage service, performing a login to a user account on a backup storage server at a remote location, calculating a first signature of a first portion of a payload data, and calculating a second signature of a second portion of the payload data. The first portion of the payload data is encrypted with the first signature to generate an encrypted first portion of the payload data, and the second portion of the payload data is encrypted with the second signature to generate an encrypted second portion of the payload data. The method further includes transmitting the first and second signatures to the backup storage server, receiving a request for the encrypted first portion of the payload data, transmitting the encrypted first portion of the payload data to the backup storage server, and refraining from transmitting the encrypted second portion of the payload data to the backup storage server. In various implementations, the method also includes generating a password protected key file that holds the first and second signatures, and transmitting the password protected key file to the backup storage server.

One implementation of a system includes a memory, a single-instance storage circuit, a user account management circuit, and a signature index. The memory holds a user-account database and a plurality of convergently encrypted portions of data. The single-instance storage circuit is coupled to the memory and is configured to prevent duplicate copies of the convergently encrypted portions of data. The user account management circuit is coupled to the memory and to the single-instance storage circuit, and is configured to enable user-initiated backup operations of data into the memory. The signature index includes signatures of the convergently encrypted portions of data stored in the memory.

The user account management circuit is configured to receive an upload request from a first client to store encrypted data for a first user account. The upload request includes a first signature of a first convergently encrypted portion of data and a second signature of a second convergently encrypted portion of data. The user account management circuit is also configured to store the first and second signatures in the user-account database as being associated with the upload request and with the first user account.

If the single-instance storage circuit determines that the first signature is absent from the signature index, the user account management circuit is configured to obtain the first convergently encrypted portion of data from the first client, to store the first convergently encrypted portion of data in the memory, and to update the signature index to include the first signature.

If the single-instance storage circuit determines that the second signature is already present in the signature index, the user account management circuit is configured to refrain from obtaining the second convergently encrypted portion of data from the first client.

The user account management circuit is additionally configured to receive a download request from a second client for data associated with a previous upload request for a second user account, to confirm the validity of the download request using authentication information for the second user account from the user-account database, and to transmit to the second client a set of convergently encrypted portions of data that correspond to signatures associated with the previous upload request and with the second user account.

BRIEF DESCRIPTION OF THE DRAWINGS

A more complete understanding of the present invention may be acquired by referring to the following description and the accompanying drawings, in which like reference numbers indicate like features.

Figure 1:
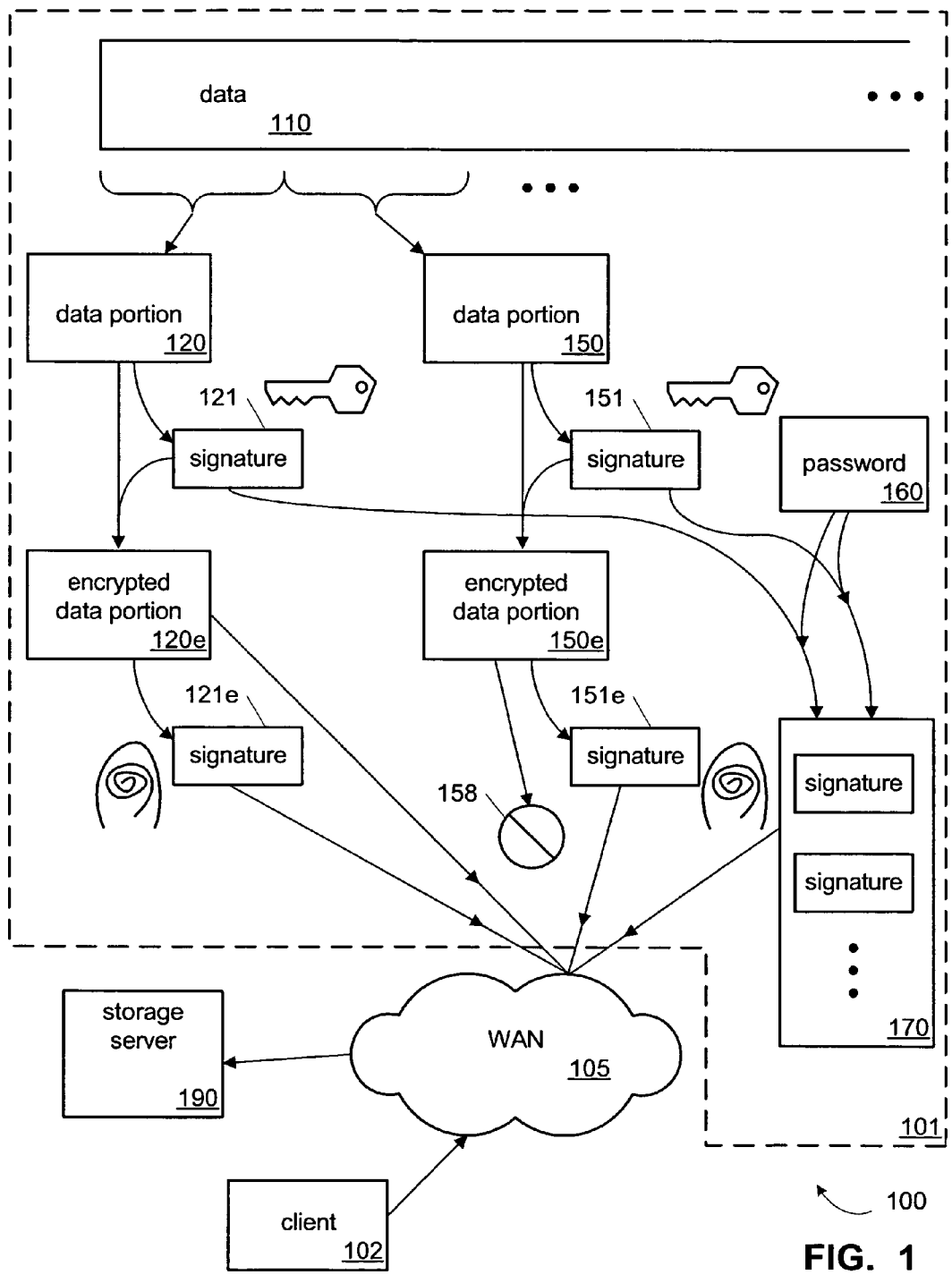
FIG. 1 is a block diagram of the flow of information from a client to a storage server in one implementation of a data backup system.

While the invention is susceptible to various modifications and alternative forms, specific embodiments of the invention are provided as examples in the drawings and detailed description. It should be understood that the drawings and detailed description are not intended to limit the invention to the particular form disclosed. Instead, the intention is to cover all modifications, equivalents and alternatives falling within the spirit and scope of the invention as defined by the appended claims.

DETAILED DESCRIPTION

FIG. 1 is a block diagram of the processing and flow of information from clients 101 and 102 to a storage server 190 for a storage service in one implementation of a data backup system 100. The diagram depicts operations performed on a set of data 110 in client 101 that enable the encryption of data 110 and the backing up of the encrypted data onto storage server 190. Storage server 190 is accessed through a wide area network (WAN) 105 such as the Internet. Similar operations (not shown) are performed for data on client 102. The operations depicted in FIG. 1 may be used in some implementations to permit the storage server to improve an efficiency of storing backup data that includes encrypted backup data.

To start, unencrypted data 110 is divided into small chunks or portions. Two such data portions 120 and 150 are depicted in FIG. 1. The size of the portions can be chosen to be large enough that only a manageable number of portions are created in a typical backup operation, yet small enough that repeated sections of the data are likely to result in portions that are duplicates of each other. The duplicate portions can subsequently be stored as a single instance of the portion, accompanied by information noting the multiple locations of the portion in the original data. This technique, of attempting to store only a single instance of data segments that are repeated in the data being stored, may be called single-instance storage. Single-instance storage systems can be used to store data more efficiently, especially in situations where the data is likely to include many repeated segments. Efficiency can also arise in situations where multiple copies of the same or similar files are kept on a storage system. A typical size for a portion of data in a single-instance storage system is, for example, a value in the range of 1-20 kilobytes (kB), such as 2 kB.

The unencrypted data portions 120 and 150 are then encrypted using convergent encryption, in which data is encrypted using its own signature as the encryption key. A signature is generated for each unencrypted data portion. The signature is calculated using an algorithm such as a strong hashing function, for example the Secure Hash Algorithm Version 1.0 (SHA1) or Hashed Message Authentication Code (HMAC) functions. The signature is then used as an encryption key to generate an encrypted version of the data portion. A second signature can then be calculated, this time for the encrypted version of the data portion. This second signature has properties that are useful for single-instance storage, as discussed below.

An example is depicted in FIG. 1, where a signature 121 is calculated from data portion 120. Signature 121 is then used as an encryption key to generate an encrypted data portion 120e from the data portion 120. Signature 121 can subsequently be used as a decryption key to recover the unencrypted data portion 120 from the encrypted data portion 120e, as discussed below. (In alternative implementations, the decryption key may be derived from signature 121, or asymmetric encryption may be employed with signature 121 being used to formulate a public and private key pair.)

A second signature 121e is calculated from encrypted data portion 120e. This second signature is generally unhelpful in the decryption of encrypted data portion 120e, since it is generally very different from signature 121. Nonetheless, signature 121e can also serve as a reproducible identifier of data portion 120. Since the only input used in the generation of signature 121e was the data portion 120, signature 121e is a stretch of data that can be reproducibly generated from data portion 120.

Thus, while signature 121e is not usable as a decryption key for recovering data portion 120 from encrypted data portion 120e, it is usable as a "fingerprint" of data portion 120. (It is also usable as a fingerprint of encrypted data portion 120e.) Similarly, encrypted data portion 120e is not usable by itself to obtain data portion 120 (because of the encryption). To an authorized user who possesses the decryption key (signature 121), however, the unencrypted data portion 120 can be readily recovered from encrypted data portion 120e. As a result of these properties, signature 121e and encrypted data portion 120e can be safely posted onto an uncontrolled storage site for future use by the authorized user. This posting is depicted in FIG. 1 as an uploading of the signature 121e and encrypted data portion 120e onto storage server 190 through WAN 105.

As a result of the uploading, storage server 190 possesses information (encrypted data portion 120e) from which data portion 120 can be recovered by an authorized user, and also possesses a fingerprint (signature 121e) of data portion 120.

Without access to the decryption key (signature 121), however, the storage site does not itself possess the tools for obtaining the original unencrypted data portion 120. A malicious user who gains access to the storage site would not easily be able to recover the original unencrypted data.

If an encrypted data portion is already present on storage server 190, then storage server generally will not need an additional copy of the same encrypted data portion. To prevent wasteful redundant storage, the storage server may receive encrypted data portions, compare them to encrypted data portions that are already present on the storage server, and discard any newly encrypted data portions that are already present. This process, however, involves some unnecessary data transfer, since some of the transferred data is ultimately discarded.

To more avoid unnecessary data transfers, the server may first obtain and receive fingerprints of the data being stored. These fingerprints can be compared to fingerprints of data that are already present on the storage server, so that the server can determine which data need to be uploaded and which do not. This process provides added efficiency in situations where the fingerprints are substantially smaller than the data they represent. In one implementation, fingerprints are used that are between 0.1% and 5% of the length of the data they represent. For example, the signature 121$e$ can be constructed as a 20 Byte stretch of data. The signature 121$e$ is thus substantially smaller than the 2 kB data portion 120. The signature 121$e$ is also smaller than encrypted data portion 120$e$, which is generally longer than the unencrypted data portion 120.

The option to avoid uploading redundant data is illustrated by the processing of data portion 150 in FIG. 1. In a manner similar to the processing of data portion 120, the processing of data portion 150 includes the generation of a signature 151 that serves as an encryption and decryption key. Data portion 150 is encrypted with the signature 151 to generate an encrypted data portion 150$e$. A signature 151$e$ is then generated from encrypted data portion 150$e$; this signature 151$e$ is usable as a fingerprint of data portion 150 and encrypted data portion 150$e$.

The signature 151$e$ is transmitted to storage server 190, which compares this newly received signature 151$e$ against an index of signatures for the encrypted data portions that are already present on the storage server. In the illustrated example, the storage server finds that signature 151$e$ is already present in the index of signatures, meaning that the encrypted data 150$e$ represented by this signature is already present on the storage server. Storage server 190 responds that encrypted data 150$e$ is not needed, and as a result no attempt is made to transfer encrypted data 150$e$ to storage server 190 (as represented by the blocking symbol 158).

In system 100, the decryption keys (signatures 121 and 151) are also stored—after being password protected—on the storage server 190. This feature is illustrated in FIG. 1 by the encryption of signatures 121 and 151 with a user-generated password 160. The result of this encryption is a password protected key file 170 that holds an armored version of the decryption keys. The password protected key file 170 is also transmitted via WAN 105 for storage on the storage server 190. In alternate implementations of the system, the decryption keys are stored separately from the storage server. For example, the decryption keys may be stored on a client computer.

Three types of information are stored on the storage server in the depicted implementation of system 100: encrypted data (encrypted data portion 120$e$), fingerprints of the encrypted data (signatures 121$e$ and 151$e$), and password protected decryption keys (password protected key file 170). This stored information is generated from two original sources: the original unencrypted data 110 and the user-generated password 160. It can be seen that if a user possesses the password 160 and has access to the storage server 190, then the user may use the information on the storage server to recover the original unencrypted data 110.

Figure 2:
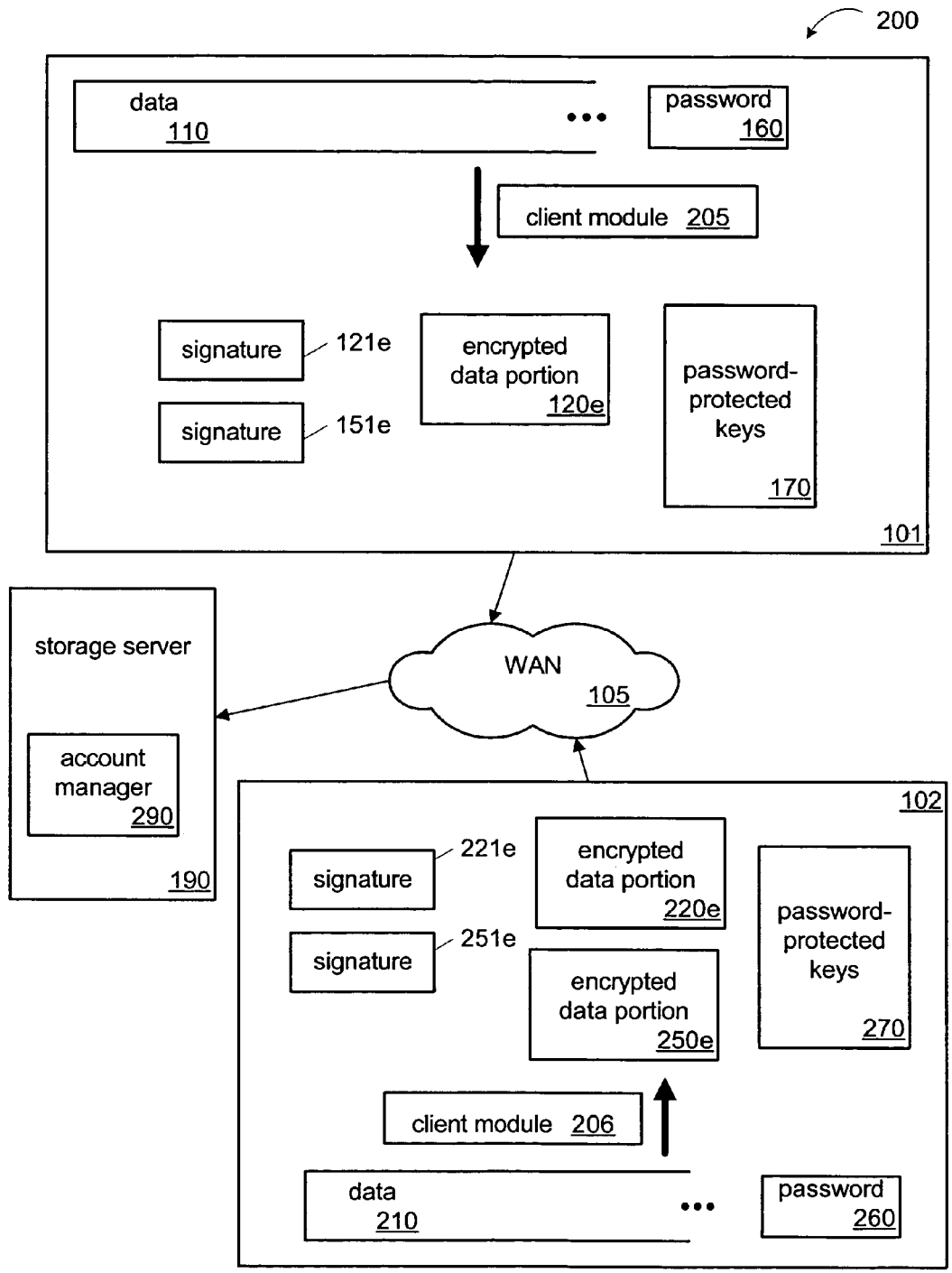
FIG. 2 is a block diagram of the processing and flow of information from users' client computers to a storage server of a storage service in one implementation of a data backup system.

FIG. 2 is a block diagram of the flow of information from several clients to a storage server in one implementation of a data backup system 200. The system 200 includes storage server 190 and illustrates an approach by which a single storage server may be used to support single-instance backup of encrypted data for multiple clients, such as client 101 and client 102. Clients 101 and 102 are equipped with client modules 205 and 206, respectively, which oversee the convergent encryption in a consistent manner to make the results usable by storage server 190. Client module 205 uses convergent encryption to generate encrypted data portion 120$e$, signatures 121$e$ and 151$e$, and password protected key file 170 from data 110 and the user-generated password 160. These generated items 120$e$, 121$e$, 151$e$, and 170 are transferred to storage server 190 for backup storage through WAN 105. Similarly, client module 206 on client 102 uses convergent encryption to generate an encrypted data portion 220$e$, an encrypted data portion 250$e$, a signature 221$e$, a signature 251$e$, and a password protected key file 270 from an unencrypted data 210 and a user-generated password 260. These generated items 220$e$, 250$e$, 221$e$, 251$e$, and 270 are also transferred to storage server 190 for backup storage through WAN 105.

Although only two clients are depicted as interacting with storage server 190, in practice hundreds or thousands or more clients may make use of the storage server 190 services. The data transfers may support a large number of users who access the storage server from different client computers at different times. In order to manage the storage and retrieval requests from the users, the storage server is equipped with a user account manager 290. Account manager 290 oversees the creation and maintenance of user accounts on the storage server. Users with accounts may upload data for backup and download backed-up data. Account manager 290 may also oversee the renewal of accounts for lapsed users who wish to retrieve data from their expired accounts. If a user requests that data be backed up in an encrypted form, the storage server coordinates with a client module on the user's client computer to perform the backup. The client module receives an input from the user (and/or from a data file) to identify the data to be backed up, and to determine the password for protecting the decryption keys. The client module then performs the convergent encryption in an appropriate manner to make the resulting information usable on the storage server. For example, in one implementation, all client modules are configured to prepare data for storage server 190 consistently use the same data chunking techniques and parameters, the same encryption functions and parameters, the same hashing functions and parameters, and the same password protection tools. The resulting encrypted data portions, signatures, and password protected key files are created in a consistent format across all clients and across all users who store data on storage server 190.

In one embodiment of the system 200, a limited set of techniques, functions, and parameters can be used by the client modules, depending on user preferences and/or the nature of data being backed up. For example, the client modules may use a particular chunking protocol if the unencrypted data is a binary application. If the unencrypted data is text data or spreadsheet data, the client modules may use other chunking protocols that are more suitable for those particular types of data. Such an approach allows some case-based flexibility, while maintaining a consistency that is needed for effective single instance storage.

In one embodiment, account manager 290 serves as a gate-keeper for the single-instance storage of encrypted or unencrypted data, and also oversees the downloading of data in response to requests by users for previously stored data. The account manager verifies that users of the storage server have valid accounts on the storage server, and assists users in establishing new accounts, if needed. In one embodiment, account manager 290 oversees the installation of client modules on client computers used by the users. In another embodiment, the account manager deploys client modules as temporary software, such as web browser-based java scripts or ActiveX controls, for example, on the client computers.

It is envisioned that storage server 190 implements a subscription based online backup service at a central provider site, providing backup services to a general customer base. Account manager 290 may be adapted based on the expected number of users and types of users that make use of storage server 190. For example, the account manager may offer more automated interfaces if the anticipated users are sophisticated system operators, and may offer more interactive or more user-friendly interfaces if the anticipated users are members of the general public. A variety of interfaces may also be used by the storage server to meet the needs of different users and/or different levels of user subscriptions.

In an alternate configuration, storage server 190 is a backup appliance deployed for the support of a limited set of clients, such as computers on a corporate computer network. The backup appliance is configured to receive instructions for encrypted backup through a user interface. Alternatively, the backup appliance may be configured to periodically or occasionally scan client computers for user preference files that include instructions for backup operations. These instructions may specify files or data sets for backup, instructions for encrypted or non-encrypted backup, the desired frequency of the various backups, and similar parameters. The instructions may also include passwords to be used for protecting encryption keys, so that the appliance can oversee the creation of password protected key files.

Figure 3:
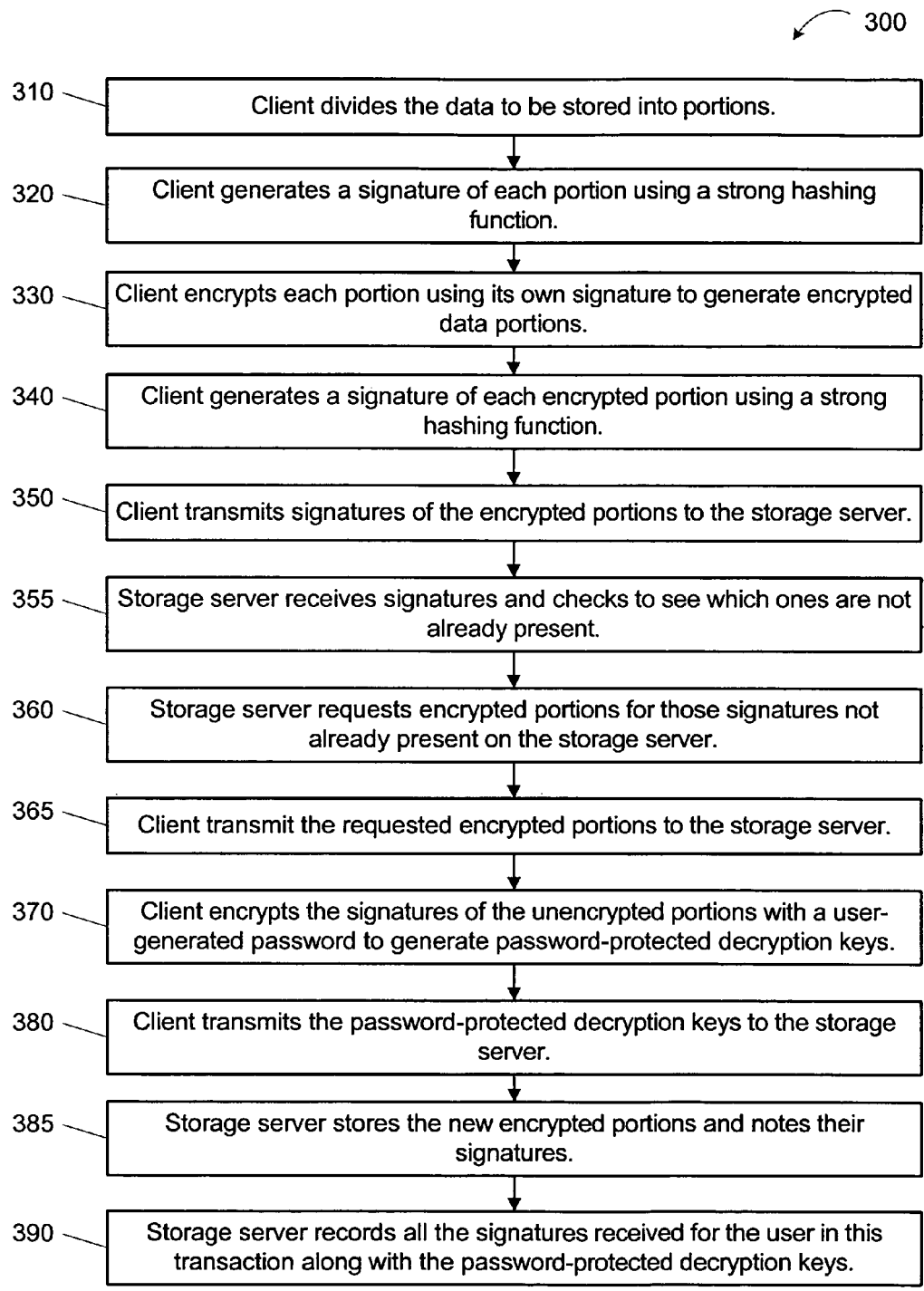
FIG. 3 is a flowchart of one implementation of a method for backing up data in an encrypted form.

FIG. 3 is a flowchart of one implementation of a method 300 for backing up data from a client onto a storage server in an encrypted form. Method 300 may be performed, for example, by client module 205 and storage server 190 to backup data from client 101 onto storage server 190. In act 310, the client divides the data into portions or chunks $C_X$ (X=1 . . . N, N=the number of portions generated from the data). The division may be performed using fixed block chunking, chunking using Rabin fingerprinting, or other chunking techniques. All clients use the same chunking method, or alternatively a limited set of chunking methods, in order to increase the chances that duplicate data portions may be created (and eventually eliminated). In act 320, each portion $C_X$ is hashed using a strong hashing function HASH (e.g. SHA1, HMAC) to obtain a signature HASH($C_X$). In act 330, the method 300 encrypts each portion of data using its own signature. For portion $C_X$, the resulting encrypted data portion is $\text{Encrypt}_{HASH(CX)}(C_X)$, meaning that HASH($C_X$) is the decryption key for chunk $C_X$. In act 340, the client then computes the signature. HASH($\text{Encrypt}_{HASH(CX)}(C_X)$) of each of the encrypted data portions from act 330. The resulting signatures serve as fingerprints of the data portions.

As discussed above, various techniques, functions, and parameters may be used to implement acts 320, 330, and 340. In various implementations of method 300, these acts are configured to ensure that if two unencrypted data portions are the same, then (1) the resulting encrypted data portions will also be the same and (2) the resulting signatures of the encrypted data portions will also be the same, even if the method is carried out on different clients and/or for different users.

In act 350, the client transmits the signatures of each of the encrypted data portions (from act 340) to the storage server. The signatures are ordered according to the presence of their corresponding data portions in the original unencrypted data (or are otherwise indexed to record the organization of the original data). The storage server receives these signatures in act 355 and searches a signature index to determine if any of these signatures represent data that is not already stored on the data server. If one or more of the signatures represent data that is not already stored on the data server (e.g., if a signature is not already present in the signature index), then the server requests the corresponding encrypted data portions from the client in act 360. The client transmits the requested encrypted data portions to the storage server in act 365.

In act 370, the client uses a password to encrypt the signatures of the unencrypted data portions. The password is supplied by a user, and is not shared with the storage server. In an alternate embodiment, the password is an automatically generated password. This password is used to encrypt all the decryption keys $\{\text{HASH}(C_X)\}_{X=1 \ldots N}$ to obtain the file of password protected decryption keys: Encrypt password ($\{\text{HASH}(C_X)\}$). If the password is preserved securely by the user, then only the user can get access to the decryption keys. In act 380, the client transmits the password protected decryption keys to the storage server.

In act 385, the storage server stores the newly received encrypted data portions and notes their signatures into the signature index. In act 390 the storage server records the received signatures so that the corresponding encrypted data portions can be provided back to the client if and when the client requests a download of the encrypted backed-up data. The storage server also stores the password protected decryption keys so that these can also be downloaded along with the encrypted backed-up data.

The acts of method 300 may be performed, as noted above, by client module 205 working with storage server 190. To provide a user with enhanced confidence in the security of the original data, however, certain aspects of the method may be left to the user. For example, acts 310-330 may be performed by a separate software under the user's direction, in isolation from the client module and in isolation from any software provided by a backup service. Thus, the user may be provided with additional confidence that the original unencrypted data are never made accessible to the backup service. In such a configuration, a client module would be configured to operate not on the original unencrypted data, but on user-supplied portions of the data, with those portions already protected by convergent encryption. This configuration may involve appropriate additional communications to coordinate the operation. For example, the user may initially need to download instructions on hashing and encryption, so that the resulting encrypted portions will be usable by the single-instance storage mechanisms on the backup service.

Figure 4:
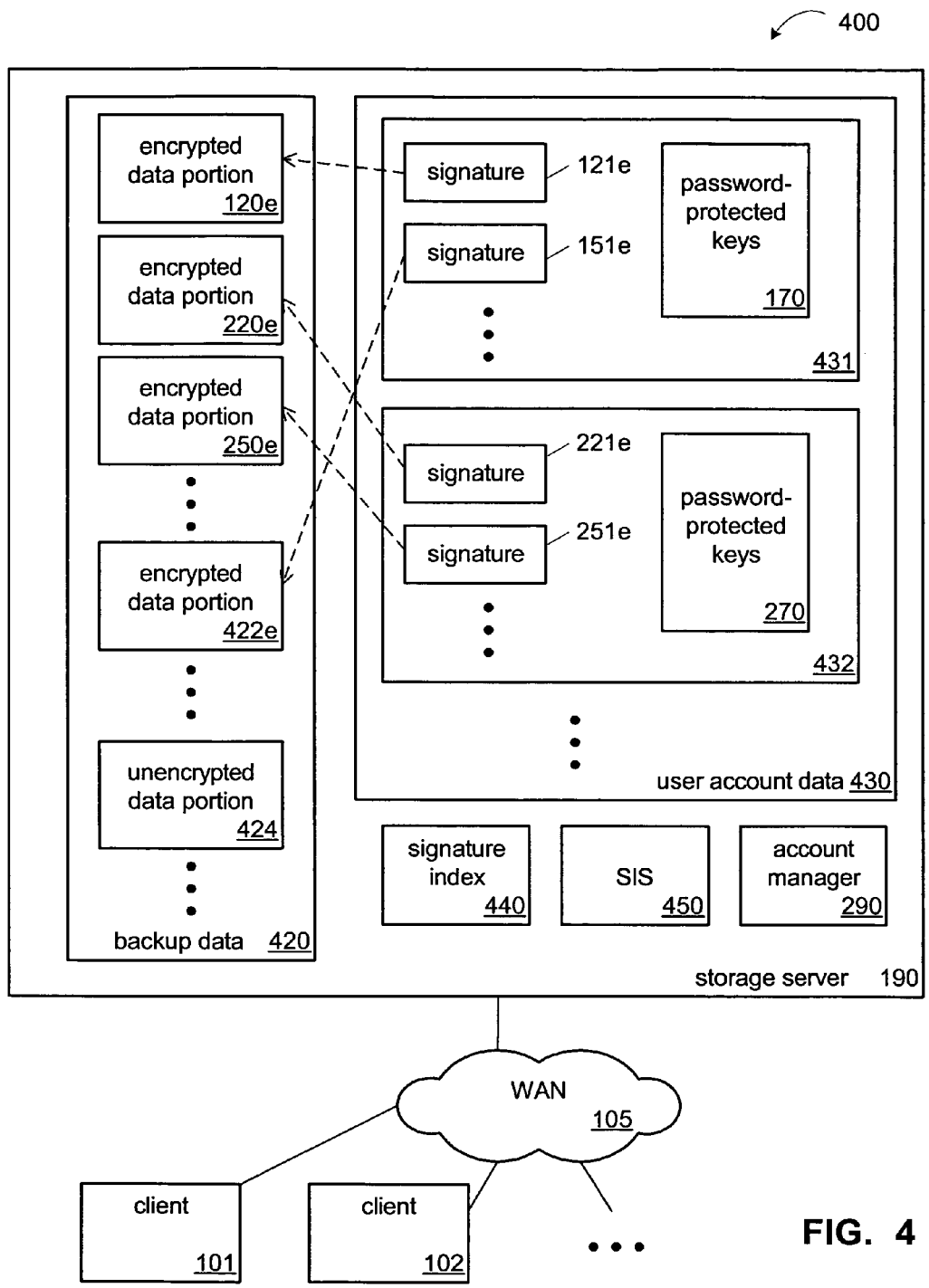
FIG. 4 is a block diagram of one implementation of an environment for the backup of encrypted data, with schematic representations of data stored on a backup server.

FIG. 4 is a block diagram of one implementation of an environment 400 for the backup of encrypted data, with schematic representations of data stored on storage server 190. Storage server 190 is coupled through WAN 105 to clients 101 and 102. Storage server 190 includes backup data 420, user account data 430, a signature index 440, a single instance storage (SIS) manager 450, and user account manager 290. Backup data 420 includes encrypted data portions 120e, 220e, and 250e, received from clients 101 and 102 as discussed above with regard to FIG. 2. Backup data 420 also includes additional encrypted data portions, such as an encrypted data portion 422e, and unencrypted data portions such as an unencrypted data portion 424.

User account data 430 includes account data for multiple users, such as account data 431 for a first user and account data 432 for a second user. Account data 431 for the first user includes a list of the data portions that have been backed up for the first user. The list of data portions is ordered or indexed in a way that indicates the order of the data portions in the original data. In one implementation, this list includes the signatures received as part of the backup operation, such as signatures 121e and 151e. As discussed above with reference to FIG. 1, signature 121e was received by the storage server along with the corresponding encrypted data portion 120e. The correspondence between signature 121e and encrypted data portion 120e is recorded in signature index 440. Signature index 440 holds a list of the signatures present on the storage server and a list of the encrypted data portions present on the storage server, and records the associations between the signatures and the encrypted data portions.

As discussed above with regard to the example of FIG. 1, signature 151e was not accompanied by an encrypted data portion. The associated encrypted data portion 150e was not transmitted to storage server 190 because a copy of the encrypted data portion 150e was already present on the storage server. In the example of FIG. 4, this copy is encrypted data portion 422e. Encrypted data portion 422e is the same data as encrypted data portion 150e, so it was not necessary to provide the storage server with another copy of this data. As a result, encrypted data 150e was not transferred to storage server 190, as represented by blocking symbol 158 in FIG. 1. By avoiding this transfer, the single-instance storage techniques provided a savings in the overhead of data transfer and also a savings in storage by avoiding a redundant copy of data on storage server 190. The absence of encrypted data portion 150e causes no hardship in the single-instance operation of the storage server. Instead, signature 151e in FIG. 4 is recorded in storage index 440 as corresponding to encrypted data portion 422e, which was already present on storage server 190.

Account data 431 for the first user also includes password protected key file 170. Similarly, account data 432 for the second user includes password protected key file 270. Account data 432 for the second user also includes signature 221e, corresponding to encrypted data portion 220e, and signature 251e, corresponding to encrypted data portion 250e.

SIS manager 450 oversees the single-instance storage of data portions stored in backup data 420. When a client requests storage of data on the storage server, SIS manager 450 determines whether or not it is necessary to store a copy of the data portions from the client. This determination can be made, for example, by receiving a list of signatures for the data portions and consulting signature index 440 to check if any of the signatures are already present in the index. If a signature is already present in the index, SIS manager 450 updates the index to indicate that the corresponding data is being used for yet another file or user. This update can include incrementing a counter that tracks the number of files and/or users that rely on the single stored copy of the corresponding data. As new signatures and new data are received on the storage server, SIS manager 450 updates signature index 440 accordingly. SIS manager 450 also updates signature index 440 appropriately when a user deletes backup data from the storage server. This update can include decrementing a counter that tracks the number of files and/or users that rely on the single stored copy of the corresponding data. If the counter is decremented to zero for a particular stored portion, that portion may be deleted since it is no longer being used for any purpose.

Figure 5:
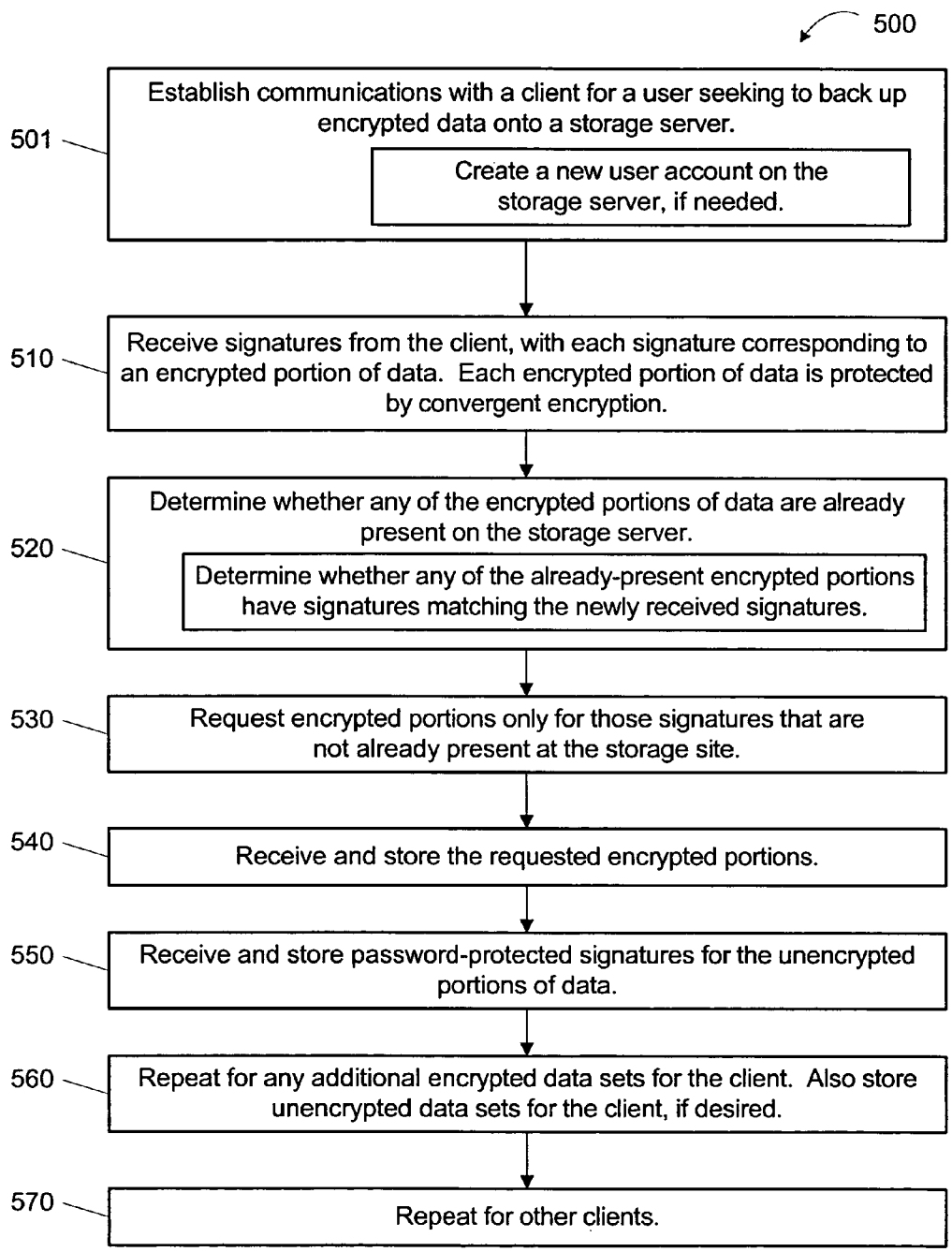
FIG. 5 is a flowchart of one implementation of a method for receiving encrypted data to be backed up.

FIG. 5 is a flowchart of one implementation of a method 500 for receiving encrypted data to be backed up. In act 501, an account manager establishes communication with a client seeking to back up encrypted data onto a storage server. The communication may be initiated by the client, such as where a user sends a request to the storage server through a web browser running on the client. If the user does not already have an account on the storage server, then a new user account is created by the account manager for the user. The account manager may require the user to pass a login procedure by supplying a user ID and account password for authentication. (This account password may be unrelated to the passwords used to protect the encryption keys, discussed above.) After authenticating the user, one implementation of the account manager provides the user with a list of options for backing up data. In one embodiment of the method 500, the options are displayed on a graphical user interface (GUI) provided through a web browser. A user can select the appropriate options using the graphical interface. The options can include, for example, performing a backup with or without encryption; on a single file, a collection of files, an entire disk drive, an entire computer, portions from each of a set of computers, or an entire set of computers; on a binary executable file, a text file, a Graphic Interchange Format (GIF) image file, a Portable Document Format (PDF) file, or other data type; with or without preservation of metadata for a file; with or without compression; as a one-time backup or on a regular basis; or other options; or combinations thereof. It is contemplated that in some implementations of method 500, the type and parameters of chunking and/or encryption and/or hashing can be varied according to user preferences, and/or according to the type and/or size of data being backed up. In various embodiments of the method 500, the type and/or size of data being backed up is automatically detected, and appropriate selections of the chunking and/or encryption and/or hashing techniques and/or parameters are automatically made based on the type and/or size of data.

If the user requests backup without encryption, the client performs the backup without using the encryption features described in subsequent blocks of method 500. In that case, the backup may nonetheless include chunking operations, to facilitate single-instance storage. Without the need for subsequent encryption, the method may be implemented to perform the chunking either on the client or on the storage server. If the no-encryption chunking is performed on the client, then the backup may also include hashing operations, so that the method can avoid duplicative data transfers.

If the user requests backup with encryption, the client performs chunking and convergent encryption on the selected data. In act 510, the storage server receives signatures from the client, with each signature corresponding to an encrypted portion of data. Each encrypted portion of data is protected by convergent encryption. In act 520, an SIS manager on the storage server determines whether any of the encrypted portions of data are already present on the storage server. This determination may be done by consulting a signature index to check whether any of the already-present encrypted portions have signatures matching the newly received signatures. In act 530, the storage server requests the needed encrypted portions from the client. The storage server only needs to request those encrypted portions that are not already present at the storage site. In act 540, the storage server receives and stores the requested encrypted portions. In act 550, the storage server receives and stores password-protected signatures for the original unencrypted portions of data. In act 560, the account manager repeats the storage operations 510-550 for additional encrypted data sets for the user. Unencrypted data sets can also be stored for the client. In act 570, the account manager repeats the storage operations 501-560 for any additional clients that request data storage on the storage server.

Figure 6:
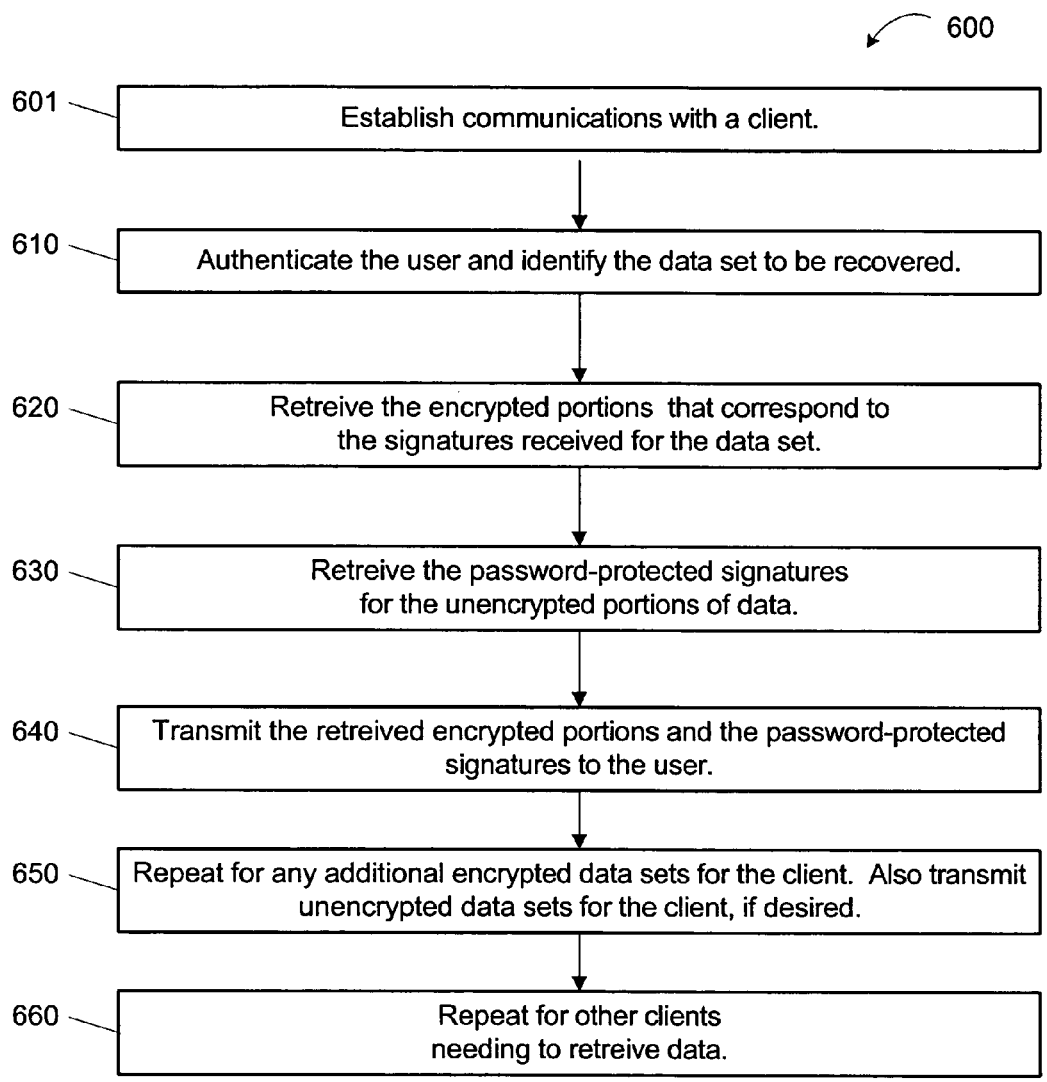
FIG. 6 is a flowchart of one implementation of a method for transmitting backed-up encrypted data.

FIG. 6 is a flowchart of one implementation of a method 600 for transmitting previously backed-up encrypted data to a requesting user. In act 601, an account manager on a storage server establishes communication with a client. The communication may be initiated by a client computer, such as where a user sends a request to the storage server through a web browser running on the client. In act 610, the account manager authenticates the user and identifies the data set to be recovered. For example, the account manager may require the user to pass a login procedure by supplying a user ID and account password for authentication. After authenticating the user, the account manager may provide the user with a list of data sets that were previously backed up onto the storage server by the user. The user may then select one or more of the listed data sets for downloading onto the client computer. In act 620, the storage server retrieves the encrypted portions corresponding to the signatures that were previously received during the backup of the selected data set. The storage server also retrieves the password-protected signatures for the unencrypted portions of data in act 630. It is envisioned that in some embodiments of method 600, the password-protected signatures are ordered according to the presence of their corresponding data portions in the original unencrypted data (or are otherwise indexed to record the organization of the original data). In act 640, the storage server transmits the retrieved encrypted portions and the password-protected signatures to the user. A client module running on the client can then obtain the appropriate password (e.g., from the user) to recover the signatures, and can then use the signatures as decryption keys to decrypt the encrypted data portions. The resulting unencrypted data portions are then recombined by the client module into the original unencrypted data.

In act 650, the user manager repeats acts 610-640 for any additional encrypted data sets that the user requests. Unencrypted data sets can also be transmitted to the client, if desired by the user. In act 660, the user manager repeats acts 601-650 for any additional clients needing to retrieve data.

Figure 7:
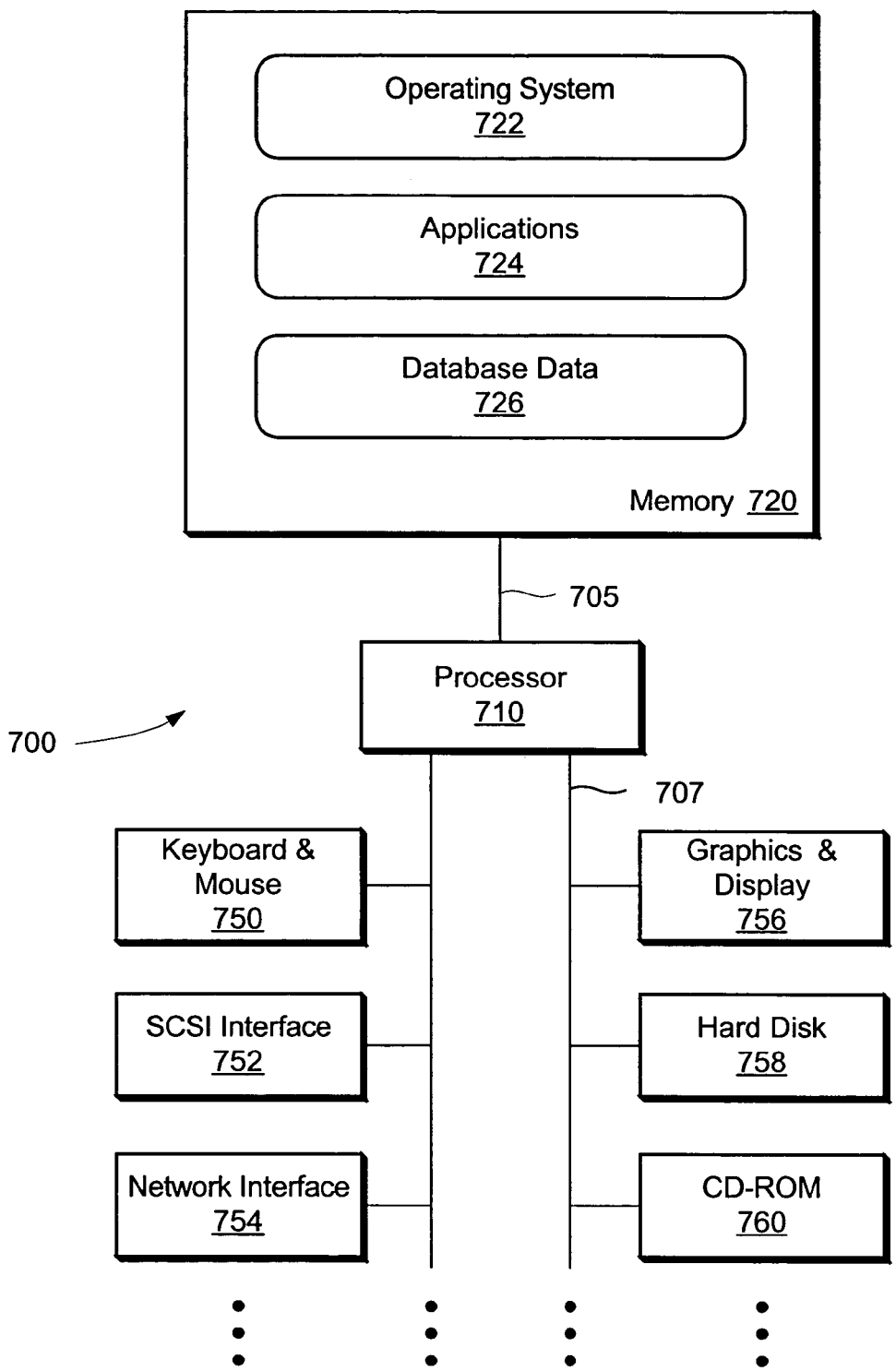
FIG. 7 is a block diagram of one implementation of a computer system.

FIG. 7 is a block diagram of one implementation of a computer system 700 that may be used for one or more of the techniques described herein. For example, the computer system 700 may be used to implement one of the previously described data servers 190 or clients 101 or 102. The computer system 700 may include a processor 710 and a memory 720 coupled together by a communications bus 705. The processor 710 may be a single processor or a number of individual processors working together. It is also contemplated that the processor 710 may be one or more virtual processors usable with interpreted languages. The memory 720 may be a random access memory (RAM) or some other dynamic storage device and may be capable of storing instructions to be executed by the processor, e.g., an operating system 722 and applications 724, as well as database data 726. The operating system 722 may include software for implementing a file system. The applications 724 may include email servers, database servers, archiving software, interfaces to archiving software, API modules, storage format management software, volume replicators, backup software, encryption software, hashing software, CDP software, user interfaces, and others. The memory 720 may also be used for storing temporary variables or other intermediate information during the execution of instructions by the processor 710.

The computer system 700 may also include devices such as a keyboard and mouse 750, a SCSI interface 752, a network interface 754, a graphics and display 756, a hard disk 758, and a CD-ROM 760, all of which are coupled to the processor 710 by a communications bus 707. It will be apparent to those having ordinary skill in the art that the computer system 700 may also include numerous elements not shown in the figure, such as additional storage devices, communications devices, input devices and output devices, as illustrated by the ellipsis shown.

FIGS. 1-6 illustrate some of the many operational examples of the techniques disclosed in the present application. Those having ordinary skill in the art will readily recognize that certain steps or operations described herein may be eliminated or taken in an alternate order. Moreover, the operations discussed with respect to FIGS. 1-6 may be implemented as one or more software programs for a computer system and encoded in a computer readable medium as instructions executable on one or more processors. The computer readable medium may include a solid-state storage medium, a magnetic storage medium, or an optical storage medium, or combinations thereof. The software programs may also be carried in a communications medium conveying signals encoding the instructions. Separate instances of these programs may be executed on separate computer systems. Thus, although certain steps have been described as being performed by certain devices, software programs, processes, or entities, this need not be the case and a variety of alternative implementations will be understood by those having ordinary skill in the art.

Additionally, those having ordinary skill in the art will readily recognize that the techniques described above may be utilized with a variety of different storage devices and computing systems with variations in, for example, the number of servers and the types of operation of the computing system, e.g., various forms of backup tools, various forms of archiving tools, chunking tools, encryption tools, and I/O operations.

Those having ordinary skill in the art will readily recognize that the techniques and methods discussed above may be implemented in software using a variety of computer languages, including, for example, traditional computer languages such as assembly language, Pascal, and C; object oriented languages such as C++, C#, and Java; and scripting languages such as Perl and Tcl/Tk. Additionally, the software 722 or 724 may be provided to the computer system via a variety of computer readable media including electronic media (e.g., flash memory), magnetic storage media (e.g., hard disk 758, a floppy disk, etc.), or optical storage media (e.g., CD-ROM 760). Communications media conveying signals encoding the instructions may also be used to provide the software 722 or 724 (e.g., via a network coupled to the network interface 754).

Although the present invention has been described in connection with several implementations, the invention is not intended to be limited to the specific forms set forth herein. On the contrary, it is intended to cover such alternatives, modifications and equivalents as can be reasonably included within the scope of the invention as defined by the appended claims.

What is claimed is:

1. A method comprising:
   making a first determination, using at least a first processor, that an encrypted first portion of a first payload data for a first storage account is absent from a backup storage;

storing the encrypted first portion of the first payload data in the backup storage, wherein
the storing the encrypted first portion of the first payload data is performed in response to the first determination;
making a second determination, using at least a second processor, that an encrypted first portion of a second payload data for a second storage account is absent from the backup storage, wherein the second storage account is distinct from the first storage account, and wherein the making the second determination comprises determining that the encrypted first portion of the second payload data does not match the encrypted first portion of the first payload data; and
storing the encrypted first portion of the second payload data in the backup storage, wherein
the storing the encrypted first portion of the second payload data is performed in response to the second determination.

2. The method of claim 1, wherein the storing the encrypted first portion of the first payload data comprises:
requesting the encrypted first portion of the first payload data from a client computer.

3. The method of claim 1, further comprising:
receiving a first user instruction to perform a password protected backup of the first payload data into the first storage account; and
receiving a second user instruction to perform a password protected backup of the second payload data into the second storage account.

4. The method of claim 1, further comprising:
preventing access to the encrypted first portion of the first payload data by users unassociated with the first account; and
preventing access to the encrypted first portion of the second payload data by users unassociated with the second account.

5. The method of claim 1, further comprising:
making a third determination that an encrypted first portion of a third payload data for a third storage account is absent from a reserved backup storage that is distinct from the backup storage; and
storing the encrypted first portion of the third payload data in the reserved backup storage in response to the third determination.

6. The method of claim 1, further comprising:
incrementing a counter for the encrypted first portion of the first payload data if the encrypted first portion of the first payload data is present in the backup storage.

7. The method of claim 1, further comprising:
refraining from storing a duplicate of the encrypted first portion of the first payload data if the encrypted first portion of the first payload data is present in the backup storage.

8. The method of claim 1 wherein a first portion of the first payload data is generated by at least one of: content-dependent chunking of the first payload data, fixed size chunking of the first payload data, or variable size chunking of the first payload data, the method further comprising:
generating the encrypted first portion of the first payload data, wherein the generating the encrypted first portion of the first payload data comprises encrypting the first portion of the first payload data with a key comprising a signature of the first portion of the first payload data.

9. The method of claim 1, further comprising:
receiving an indicator of the encrypted first portion of the first payload data; and
receiving an indicator of the encrypted first portion of the second payload data;
wherein
the making the first determination comprises examining the indicator of the encrypted first portion of the first payload data, and
the making the second determination comprises examining the indicator of the encrypted first portion of the second payload data.

10. The method of claim 9, wherein the indicator of the encrypted first portion of the first payload data comprises a signature of the encrypted first portion of the first payload data.

11. The method of claim 10, wherein:
the signature is a hash of the encrypted first portion of the payload data;
the examining the indicator of the encrypted first portion of the first payload data comprises determining whether the hash is present in an index stored on the backup storage.

12. The method of claim 1, further comprising:
refraining from storing a duplicate of the encrypted first portion of the first payload data if the encrypted first portion of the first payload data is present in the backup storage;
refraining from storing a duplicate of the encrypted first portion of the second payload data if the encrypted first portion of the second payload data is present in the backup storage;
determining whether an encrypted second portion of the first payload data is present in the backup storage;
storing the encrypted second portion of the first payload data if the encrypted second portion of the first payload data is absent from the backup storage;
refraining from storing a duplicate of the encrypted second portion of the first payload data if the encrypted second portion of the first payload data is present in the backup storage;
determining whether an encrypted second portion of the second payload data is present in the backup storage;
storing the encrypted second portion of the second payload data if the encrypted second portion of the second payload data is absent from the backup storage; and
refraining from storing a duplicate of the encrypted second portion of the second payload data if the encrypted second portion of the second payload data is present in the backup storage.

13. The method of claim 1, further comprising:
generating the encrypted first portion of the first payload data, wherein the generating the encrypted first portion of the first payload data comprises encrypting a first portion of the first payload data with a key comprising a signature of the first portion of the first payload data;
generating the encrypted first portion of the second payload data, wherein the generating the encrypted first portion of the second payload data comprises encrypting a first portion of the second payload data with a key comprising a signature of the first portion of the second payload data;
receiving a first password protected key file associated with the first storage account, the first password protected key file comprising the signature of the first portion of the first payload data;
receiving a second password protected key file associated with the second storage account, the second password protected key file comprising the signature of the first portion of the second payload data;

storing the first password protected key file in the backup storage; and storing the second password protected key file in the backup storage.

14. A method comprising:

performing a login to a user account on a backup storage server;

generating a first signature of a first portion of a payload data;

generating a second signature of a second portion of the payload data;

encrypting the first portion of the payload data with the first signature to generate an encrypted first portion of the payload data;

encrypting the second portion of the payload data with the second signature to generate an encrypted second portion of the payload data;

transmitting the first and second signatures to the backup storage server;

receiving a request for the encrypted first portion of the payload data;

transmitting the encrypted first portion of the payload data to the backup storage server;

refraining from transmitting the encrypted second portion of the payload data to the backup storage server;

generating a password protected key file comprising the first and second signatures; and transmitting the password protected key file to the backup storage server.

15. The method of claim 14, wherein the transmitting the encrypted first portion of the payload data to the backup storage server comprises transmitting to a remote location.

16. A computer readable medium comprising:

a computer-readable storage medium; and program instructions stored on the computer-readable storage medium and executable on a processor, the program instructions comprising first determining instructions for determining whether an encrypted first portion of a first payload data for a first storage account is present in a backup storage;

instructions for obtaining and storing the encrypted first portion of the first payload data in the backup storage, wherein the storing the encrypted first portion of the first payload data is performed only if the encrypted first portion of the first payload data is absent from the backup storage; and second determining instructions for determining whether an encrypted first portion of a second payload data for a second storage account is present in the backup storage, wherein the second determining instructions comprise third determining instructions for determining whether the encrypted first portion of the second payload data matches the encrypted first portion of the first payload data.

17. A system comprising:

a first determining means for making a first determination that whether an encrypted first portion of a first payload data for a first storage account is absent from a backup storage, wherein the first determining means comprises a processor coupled to the backup storage;

means for storing the encrypted first portion of the first payload data in the backup storage, wherein the storing the encrypted first portion of the first payload data is performed in response to the first determination; and a second determining means for making a first determination that whether an encrypted first portion of a second payload data for a second storage account is absent from the backup storage, wherein the second determining means comprises a processor coupled to the first determining means and configured third for determining whether the encrypted first portion of the second payload data matches the encrypted first portion of the first payload data.

18. The system of claim 17, further comprising:

storing means configured to store the encrypted first portion of the second payload data only if the encrypted first portion of the second payload data is absent from the backup storage.

19. The system of claim 17, further comprising:

means for preventing access to the encrypted first portion of the first payload data by users unassociated with the first account; and means for preventing access to the encrypted first portion of the second payload data by users unassociated with the second account.

20. The system of claim 17, further comprising:

means for receiving an indicator of the encrypted first portion of the first payload data; and means for receiving an indicator of the encrypted first portion of the second payload data;

wherein the first determining means comprises means for examining the indicator of the encrypted first portion of the first payload data, and the second determining means comprises means for examining the indicator of the encrypted first portion of the second payload data.

21. The system of claim 20, wherein the indicator of the encrypted first portion of the first payload data comprises a signature of the encrypted first portion of the first payload data.

22. The system of claim 21, wherein:

the signature is a hash of the encrypted first portion of the payload data;

the means for examining the indicator of the encrypted first portion of the first payload data comprises means for determining whether the hash is present in an index stored on the backup storage.

23. A computer readable medium comprising a computer-readable storage medium, having encoded therein program instructions executable on a processor to implement each of:

performing a login to a user account on a backup storage server;

generating a first signature of a first portion of a payload data;

generating a second signature of a second portion of the payload data;

encrypting the first portion of the payload data with the first signature to generate an encrypted first portion of the payload data;

encrypting the second portion of the payload data with the second signature to generate an encrypted second portion of the payload data;

transmitting the first and second signatures to the backup storage server;

receiving a request for the encrypted first portion of the payload data;

transmitting the encrypted first portion of the payload data to the backup storage server;

refraining from transmitting the encrypted second portion of the payload data to the backup storage server;

generating a password protected key file comprising the first and second signatures; and transmitting the password protected key file to the backup storage server.

24. The computer readable medium of claim 23, wherein the transmitting the encrypted first portion of the payload data to the backup storage server comprises transmitting to a remote location.

25. The method of claim 1, wherein the second processor is the first processor.

26. The method of claim 1, wherein:

the first storage account corresponds to a first user; and the second storage account corresponds to a second user distinct from the first user.

27. The method of claim 1, wherein the determining that the encrypted first portion of the second payload data does not match the encrypted first portion of the first payload data comprises:

determining that the first portion of the second payload data does not match the first portion of the first payload data.

28. The system of claim 17, wherein the determining whether the encrypted first portion of the second payload data matches the encrypted first portion of the first payload data comprises:

determining whether the first portion of the second payload data matches the first portion of the first payload data.

* * * * *